(12) United States Patent
Lv et al.

(10) Patent No.: US 7,819,970 B2
(45) Date of Patent: Oct. 26, 2010

(54) PROTECTIVE CONCRETE FOR WEAKENING THE INTENSITY OF PROTON RADIATION

(76) Inventors: Yingzhi Lv, Bashan Village, Boshan District, Zibo, Shangdong 255100 (CN); Yingren Lv, Bashan Village, Boshan District, Zibo, Shangdong 255100 (CN); Yan Lv, Bashan Village, Boshan District, Zibo, Shangdong 255100 (CN); Qiang Lv, Bashan Village, Boshan District, Zibo, Shangdong 255100 (CN); Yongsheng Gao, Bashan Village, Boshan District, Zibo, Shangdong 255100 (CN)

( * ) Notice: Subject to any disclaimer, the term of this patent is extended or adjusted under 35 U.S.C. 154(b) by 0 days.

(21) Appl. No.: 12/448,649

(22) PCT Filed: Jul. 20, 2007

(86) PCT No.: PCT/CN2007/002219

§ 371 (c)(1),
(2), (4) Date: Jun. 29, 2009

(87) PCT Pub. No.: WO2008/080282

PCT Pub. Date: Jul. 10, 2008

(65) Prior Publication Data

US 2009/0293770 A1 Dec. 3, 2009

(30) Foreign Application Priority Data

Dec. 28, 2006 (CN) .................. 2006 1 0166282

(51) Int. Cl.
C04B 14/34 (2006.01)
C04B 14/00 (2006.01)
C04B 22/04 (2006.01)
C04B 28/00 (2006.01)

(52) U.S. Cl. ............... 106/640; 106/638; 106/733; 106/736; 106/738; 106/815; 106/816; 106/817; 252/478; 252/582

(58) Field of Classification Search .............. 106/638, 106/640, 433, 736, 738, 815, 816, 817; 252/478, 252/582
See application file for complete search history.

(56) References Cited

U.S. PATENT DOCUMENTS

| | | | | |
|---|---|---|---|---|
| 1,576,730 A | * | 3/1926 | Harth | 252/478 |
| 5,786,611 A | * | 7/1998 | Quapp et al. | 250/515.1 |
| 6,166,390 A | * | 12/2000 | Quapp et al. | 250/506.1 |
| 6,630,683 B2 | * | 10/2003 | Vanvor | 250/518.1 |
| 7,250,119 B2 | * | 7/2007 | Sayala | 252/478 |
| 7,449,131 B2 | * | 11/2008 | Hayner et al. | 252/478 |

FOREIGN PATENT DOCUMENTS

GB 2004406 A * 3/1979

OTHER PUBLICATIONS

Derwent-Acc-No. 1971-38784S, abstract of German Patent Specification filed Oct. 1968.*
Derwent-Acc-No. 1993-009231, abstract of Chinese Patent Specification (Apr. 1992).*
Machine Translation of Chinese Patent Specification No. CN86-86100457 (Sep. 1986).*
Translation of Chinese Written Opinion PCT/CN2007/002219 (Oct. 2007).*

* cited by examiner

*Primary Examiner*—Anthony J Green
(74) *Attorney, Agent, or Firm*—Raymond Y. Chan; David and Raymond Patent Firm

(57) ABSTRACT

Provided is a protective concrete for weaken the intensity of proton radiation, and it is prepared by mixing 525# cement 500-700 Kg; barite sand 1000-1400 kg, barite stone 1500-1800 Kg, lead powder 180-200 Kg and water 170-180 Kg. The barite that can absorb the proton radiation is used, so the present concrete is much better than conventional concretes in weakening the proton radiation, and 1.5 m-thick wall without lead plates which is prepared with the present concrete can achieve the same effect on weakening the proton radiation with a conventional 2 m-thick wall covering with lead plates.

5 Claims, No Drawings

PROTECTIVE CONCRETE FOR WEAKENING THE INTENSITY OF PROTON RADIATION

BACKGROUND OF THE PRESENT INVENTION

1. Field of Invention

The present invention relates to a preparation method of concrete, and more particularly to a protective concrete for weakening the intensity of proton radiation.

2. Description of Related Arts

The proton radiation system is one of the most advanced systems for radiotherapy, but it causes serious radiation pollution. Currently, there are four existing proton radiation system in the world, wherein one of them is in Wang Jie hospital, Zi Bo, China. According to foreign safety standards, a concrete wall with at least 2 m thick and built-in with lead plates is required for preventing the leakage of the emission exposure of radiation. However, the disadvantages of the concrete wall are that the construction of the concrete wall is complicated, the manufacturing cost of the concrete wall is relatively high, the concrete wall requires relatively larger installation space, and the quality of the concrete wall is set at a relatively high standard. In addition, the efficiency of the concrete wall is relatively low to prevent the leak of the radiation. Since the concrete wall requires a lot of lead plates for radiation insulation, the concrete wall is considered as not an environmental friendly product. However, there is no other radiation shielding product made of concrete for minimizing or blocking the proton radiation.

SUMMARY OF THE PRESENT INVENTION

A main object of the present invention is to provide a protective concrete for weakening the intensity of proton radiation.

Accordingly, in order to accomplish the above objects, the present invention provides a concrete product, comprising a mixture of the raw materials of 500-700 kg of 525# cement, 1000-1400 kg of barite sand, 1500-1800 kg of barite stone, 180-200 kg of lead powder, and 170-175 kg of water.

Preferably, the concrete product of the present invention is made of the raw materials of 550-650 kg of 525# cement, 1000-1300 kg of barite sand, 1600-1700 kg of barite stone, 190-200 kg of lead powder, and 170-175 kg of water. In other words, the weight of 525# cement is limited between 550 and 650 kg, the weight of barite sand is limited between 1000 and 1300 kg, the weight of barite stone is limited between 1600 and 1700 kg, the weight of lead powder is limited between 190 and 200 kg, and the weight of water is limited between 170 and 175 kg.

More specifically, the concrete product of the present invention is made of the raw materials of 650 kg of 525# cement, 1150 kg of barite sand, 1650 kg of barite stone, 210 kg of lead powder, and 175 kg of water.

According to the present invention, the grain size of barite sand is selected with a range between 0.1 and 0.2 mm. The grain size of the barite stone is selected with a range between 2.5 and 2.8 cm.

The volume weight ratio of the concrete product of the present invention has a range between 4300 and 4600 kg/m$^3$.

Accordingly, the concrete product of the present invention utilizes barite, i.e. barite sand and barite stone, as a substitution of lead plate, because barite can effectively absorb proton from radiation. Therefore, the concrete product of the present invention is adapted to weaken the intensity of proton radiation. When the concrete product is constructed to have a 1.5 m thickness, the concrete product of the present invention achieves the same result of the conventional concrete having 2 m thickness and built-in lead plates for weakening the intensity of proton radiation.

These and other objectives, features, and advantages of the present invention will become apparent from the following detailed description and the appended claims.

DETAILED DESCRIPTION OF THE PREFERRED EMBODIMENT

According to a first preferred embodiment of the present invention, a protective concrete is a concrete product made of 700 kg of 525# cement, 1200 kg of barite sand, 1780 kg of barite stone, 200 kg of lead powder, and 180 kg of water. The manufacturing process of the protective concrete is the same as the conventional process of concrete.

Referring to a second embodiment of the present invention, the protective concrete is a concrete product made of 500 kg of 525# cement, 1100 kg of barite sand, 1630 kg of barite stone, 190 kg of lead powder, and 170 kg of water.

Referring to a third embodiment of the present invention, the protective concrete is a concrete product made of 600 kg of 525# cement, 1180 kg of barite sand, 1650 kg of barite stone, 195 kg of lead powder, and 170 kg of water.

Referring to a fourth embodiment of the present invention, the protective concrete is a concrete product made of 650 kg of 525# cement, 1150 kg of barite sand, 1750 kg of barite stone, 198 kg of lead powder, and 175 kg of water.

According to the first through fourth embodiments, the grain size of barite sand is selected with a range between 0.1 and 0.2 mm. The grain size of the barite stone is selected with a range between 2.5 and 2.8 cm.

The weight-volume ratio of the concrete product of the present invention has a range between 4300 and 4600 kg/m$^3$.

The concrete product of the present invention, through the first to fourth embodiments, is made by the conventional construction process of stirring and mixing the raw materials through a concrete mixer, such as a wheelbarrow, at a room temperature for maintaining the condition of the concrete product for 24 to 48 hours.

One skilled in the art will understand that the embodiment of the present invention described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A protective concrete for weakening the intensity of proton radiation, comprising a mixture of 500-700 kg of 525# cement, 1000-1400 kg of barite sand, 1500-1800 kg of barite stone, 180-200 kg of lead powder, and 170-175 kg of water.

2. The protective concrete, as recited in claim 1, wherein the weight of said 525# cement is limited between 550 and 650 kg, the weight of said barite sand is limited between 1000 and 1300 kg, the weight of said barite stone is limited between 1600 and 1700 kg, the weight of said lead powder is limited between 190 and 200 kg, and the weight of said water is limited between 170 and 175 kg.

3. The protective concrete, as recited in claim 1, which is made of 650 kg of said 525# cement, 1150 kg of said barite sand, 1650 kg of said barite stone, 210 kg of said lead powder, and 175 kg of said water.

4. The protective concrete, as recited in claim 1, wherein the grain size of said barite sand is selected with a range between 0.1 and 0.2 mm, wherein the grain size of said barite stone is selected with a range between 2.5 and 2.8 cm.

5. The protective concrete, as recited in claim 1, which has a volume weight ratio in a range between 4300 and 4600 kg/m$^3$.

* * * * *